(12) United States Patent
Wiegman

(10) Patent No.: US 12,330,522 B2
(45) Date of Patent: *Jun. 17, 2025

(54) SYSTEM AND METHOD FOR OVERCURRENT PROTECTION IN AN ELECTRIC VEHICLE

(71) Applicant: BETA AIR, LLC, South Burlington, VT (US)

(72) Inventor: Herman Wiegman, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 616 days.

This patent is subject to a terminal disclaimer.

(21) Appl. No.: 17/732,982

(22) Filed: Apr. 29, 2022

(65) Prior Publication Data

US 2023/0202330 A1 Jun. 29, 2023

Related U.S. Application Data

(63) Continuation-in-part of application No. 17/564,299, filed on Dec. 29, 2021, now Pat. No. 11,498,444.

(51) Int. Cl.
*B60L 53/62* (2019.01)
*B60L 53/66* (2019.01)

(52) U.S. Cl.
CPC .............. *B60L 53/62* (2019.02); *B60L 53/66* (2019.02); *B60L 2200/10* (2013.01)

(58) Field of Classification Search
CPC ...................................................... B60L 53/62
USPC ...................................................... 320/119
See application file for complete search history.

(56) References Cited

U.S. PATENT DOCUMENTS

| | | | |
|---|---|---|---|
| 5,369,352 A | 11/1994 | Toepfer et al. | |
| 5,478,250 A | 12/1995 | Hoffman | |
| 6,123,569 A | 9/2000 | Fukushima et al. | |
| 6,225,153 B1 | 5/2001 | Neblett et al. | |
| 7,750,496 B2 | 7/2010 | Cottingham, III et al. | |
| 8,633,678 B2 | 1/2014 | Yegin et al. | |
| 9,073,439 B2 | 7/2015 | Brown et al. | |
| 9,434,268 B2 | 9/2016 | Deboer et al. | |
| 10,076,965 B2 | 9/2018 | Minamii et al. | |
| 10,493,857 B2 | 12/2019 | Jang et al. | |
| 10,946,753 B2 | 3/2021 | Cho | |
| 2012/0286729 A1* | 11/2012 | Yegin | B60L 3/0069 320/109 |
| 2013/0271298 A1* | 10/2013 | Restrepo | H02H 3/105 340/945 |
| 2013/0286513 A1* | 10/2013 | Holley | H02H 9/005 361/20 |
| 2015/0380955 A1 | 12/2015 | Urschel et al. | |
| 2016/0052411 A1* | 2/2016 | Tanabe | H02J 7/00047 320/109 |

(Continued)

FOREIGN PATENT DOCUMENTS

CN 206841202 U 1/2018

*Primary Examiner* — Jerry D Robbins
(74) *Attorney, Agent, or Firm* — Hoffman Warnick LLC

(57) ABSTRACT

A system and method for the overcurrent protection in an electric vehicle is illustrated. The system comprises an electric vehicle charging port that includes an AC pin, a DC pin, a sensor, and a controller. The electric vehicle charging port also includes a protection circuit, wherein the protection circuit is configured to control a transmission of power through the electric vehicle charging port.

20 Claims, 4 Drawing Sheets

(56) References Cited

U.S. PATENT DOCUMENTS

2016/0336772 A1 11/2016 Dallachiesa et al.
2017/0297442 A1* 10/2017 Eisner .................. H02J 7/0045
2017/0313207 A1* 11/2017 Gherardi ................ B60L 15/20
2020/0144843 A1* 5/2020 Kaptein ................ H02H 3/093
2021/0245623 A1 8/2021 Zhao

* cited by examiner

SYSTEM AND METHOD FOR OVERCURRENT PROTECTION IN AN ELECTRIC VEHICLE

CROSS-REFERENCE TO RELATED APPLICATIONS

This application is a continuation-in-part of Nonprovisional application Ser. No. 17/564,299 filed on Dec. 29, 2021, and titled "SYSTEM AND METHOD FOR OVERCURRENT PROTECTION IN AN ELECTRIC VEHICLE," the entirety of which is incorporated herein by reference.

FIELD OF THE INVENTION

The present invention generally relates to the field of electric aircraft. In particular, the present invention is directed to a system and method for the overcurrent protection in an electric vehicle.

BACKGROUND

Overcurrent in an electric vehicle during charging may cause electrical fires or extreme damage to the equipment, which may cause catastrophic damage to the electric vehicle and its inhabitants.

SUMMARY OF THE DISCLOSURE

In an aspect, a system for the overcurrent protection in an electric vehicle is provided. The system includes a charging port, wherein the charging port includes: an AC pin; a DC pin; a protection circuit, wherein the protection circuit is configured to control a transmission of power through the electric vehicle charging port; a sensor, wherein the sensor is configured to detect an output current from a charging station; and a controller communicatively connected to the sensor, wherein the controller is configured to: detect an overcurrent output as a function of the output current; and trip the protection circuit as a function of the overcurrent output.

In another aspect, a method for the overcurrent protection in an electric vehicle is presented. The method includes: providing a charging port of an electric aircraft; controlling, by a protection circuit of the charging port, a transmission of power through the charging port; detecting, by a sensor of the charging port, an output current; transmitting, by the sensor, the output current to a controller of the electric aircraft port; determining, by the controller, an overcurrent output as a function of the output current; and tripping, by the controller, the protection circuit as a function of the overcurrent output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For illustrating the invention, the drawings show aspects of one or more embodiments of the invention. However, the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to an aircraft with a system for the overcurrent protection in an electric vehicle. In an embodiment, this disclosure includes a vehicle with an electric vehicle charging port that comprises a protection circuit. Aspects of the present disclosure includes a sensor configured to detect an output current. Aspects of the present disclosure also includes a controller communicatively connected to the sensor.

Figure 1:
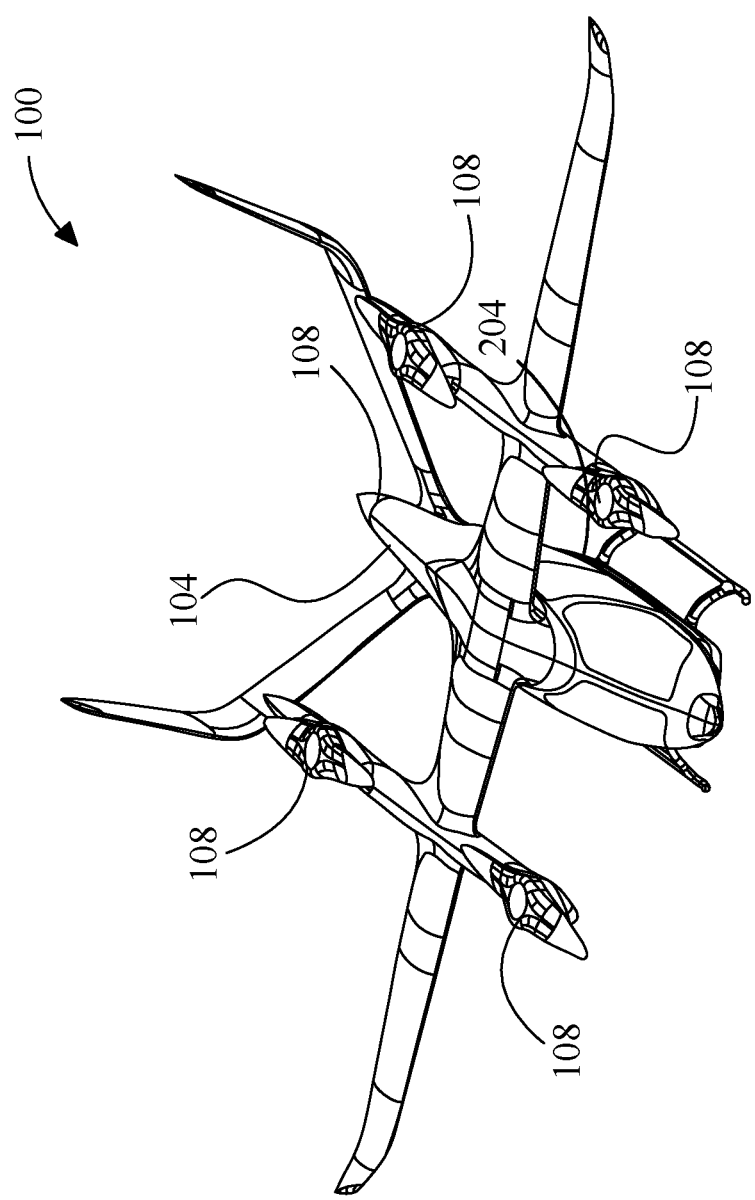
FIG. 1 is a diagrammatic representation of an exemplary embodiment of an electric aircraft.

Referring now to FIG. 1, an exemplary embodiment of a vehicle 100 is illustrated. In an embodiment, vehicle 100 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

Still referring to FIG. 1, aircraft 100 may include a fuselage 104, a flight component 108 (or one or more flight components 108), computing device 112, and a sensor 116. Both the computing device 112 and sensor 116 are described further herein with reference to FIG. 2.

As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers includes the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque includes only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which may include airfoils configured to create a pressure differential resulting in lift. Wings may generally dispose on the left and right sides of the aircraft symmetrically, at a point between nose and empennage. Wings may include a plurality of geometries in planform view, swept swing, tapered, variable wing, triangular, oblong, elliptical, square, among others. A wing's cross section geometry may include an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may include differing and/or similar cross-sectional geometries over its cord length or the length from wing tip to where wing meets aircraft's body. One or more wings may be symmetrical about aircraft's longitudinal plane, which includes the longitudinal or roll axis reaching down the center of aircraft through the nose and empennage, and plane's yaw axis. Laterally extending element may include controls surfaces configured to be commanded by a pilot or pilots to change a wing's geometry and therefore its interaction with a fluid medium, like air. Control surfaces may include flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may include a combination of control surfaces to perform maneuvers while flying or on ground.

Still referring to FIG. 1, aircraft 100 may include a plurality of flight components 108. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, plurality of flight components 108 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis. The lift propulsor is further described herein with reference to FIG. 2.

In an embodiment, and still referring to FIG. 1, plurality of flight components 108 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 1, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, plurality of flight components 108 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 100 forward with an equal amount of force. In an embodiment, and without limitation, the more air forced behind aircraft, the greater the thrust force with which aircraft 100 is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 2:
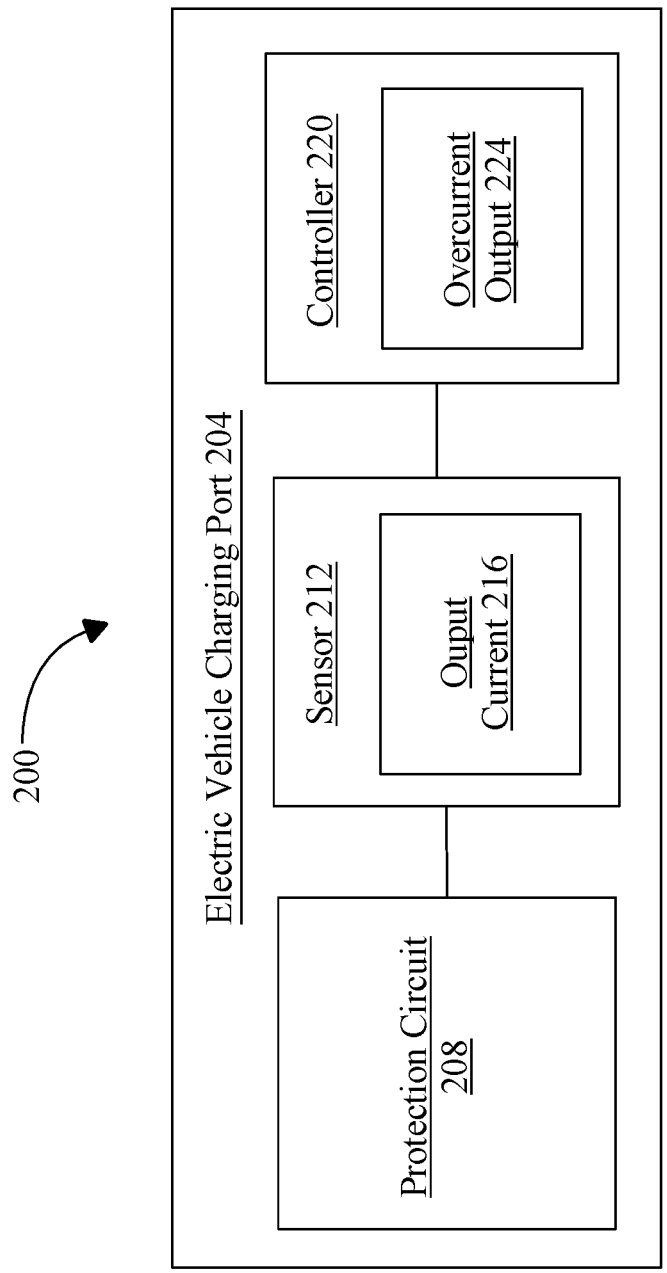
FIG. 2 illustrates a block diagram of an exemplary embodiment of a system for the overcurrent protection in an electric vehicle.

Referring now to FIG. 2, system 200 exemplifies a system for the overcurrent protection in an electric vehicle. System 200 comprises an electric vehicle charging port 204 (also referred to in this disclosure as a "charging port" or "port"), protection circuit 208, sensor 212, output current 216, controller 220, and overcurrent output 224. In this disclosure, "overcurrent protection" refers to the protection against excessive currents or current beyond the acceptable current rating of the respective equipment. Major types of overcurrent include short circuit, overload, and ground-fault. Overcurrent conditions can occur at any part electrical-power distribution system. Overcurrent can also occur when a motor is mechanically overloaded. This may be caused by excess friction within its internal bearing surfaces, excess heat, or some other mechanical overload. Overload is a controlled overcurrent situation, normally of low magnitude. Overcurrent may occur during charging of an electric vehicle. For example, and without limitation, overcurrent may occur when a connector of a charger is attached to a charging port, such as charging port 204. An electric vehicle charger connector may be any charging connector described in U.S. Nonprovisional application Ser. No. 17/563,223, filed on Dec. 28, 2021, and entitled "SYSTEMS AND METHODS FOR A LOCKING ELECTRIC AIRCRAFT CONNECTOR," the entirety of which is incorporated herein by reference.

Still referring to FIG. 2, system 200 includes an electric vehicle charging port 204 of the vehicle. Charging port 204 may include an alternating current (AC) pin and/or a direct current (DC) pin, which are each configured to supply and/or receive electrical power. For example, AC pin and DC pin may be configured to facilitate transmission of electrical power between the electric aircraft and a charging station, such as via a connector of a charging station attached to port 204. AC pin is configured to supply and/or receive AC power. For the purposes of this disclosure, "AC power" refers to electrical power provided with a bi-directional flow of charge, where the flow of charge is periodically reversed. AC pin may supply AC power at a variety of frequencies. For example, in a non-limiting embodiment, AC pin may supply AC power with a frequency of 50 Hz. In another non-limiting embodiment, AC pin may supply AC power with a frequency of 60 Hz. One of ordinary skill in the art, upon reviewing the entirety of this disclosure, would realize that AC pin may supply a wide variety of frequencies. AC power produces a waveform when it is plotted out on a current vs. time or voltage vs. time graph. In some embodiments, the waveform of the AC power supplied by AC pin may be a sine wave. In other embodiments, the waveform of the AC power supplied by AC pin may be a square wave. In some embodiments, the waveform of the AC power supplied by AC pin may be a triangle wave. In yet other embodiments, the waveform of the AC power supplied by AC pin may be a sawtooth wave. The AC power supplied by AC pin may, in general have any waveform, so long as the wave form produces a bi-directional flow of charge. AC power may be provided without limitation, from alternating current generators, "mains" power provided over an AC power network from power plants, AC power output by AC voltage converters including transformer based converters, and/or AC power output by inverters that convert DC power, as described above, into AC power. DC pin is configured to supply and/or receive DC power. "DC power," for the purposes of this disclosure refers, to a one-directional flow of charge. For example, in some embodiments, DC pin may supply power with a constant current and voltage. As another example, in other embodiments, DC pin may supply power with varying current and voltage, or varying current constant voltage, or constant current varying voltage. In another embodiment, when charging connector is charging certain types of batteries, DC pin may support a varied charge pattern. This involves varying the voltage or current supplied during the charging process in order to reduce or minimize battery degradation. Examples of DC power flow include halfwave rectified voltage, full-wave rectified voltage, voltage supplied from a battery or other DC switching power source, a DC converter such as a buck or boost converter, voltage supplied from a DC dynamo or other generator, voltage from photovoltaic panels, voltage output by fuel cells, or the like. For the purposes of this disclosure, "supply," "supplies," "supplying," and the like, include both currently supplying and capable of supplying. For example, a live pin that "supplies" DC power need not be currently supplying DC power, it can also be capable of supplying DC power.

With continued reference to FIG. 2, electric vehicle charging port 204 may include a ground pin. Ground pin is an electronic connector that is connected to ground. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For instance, a chassis ground may be a floating ground when the potential is not equal to earth ground. In some embodiments, a negative pole in a DC circuit may be grounded. A "grounded connection," for the purposes of this disclosure, is an electrical connection to "ground." A circuit may be grounded in order to increase safety in the event that a fault develops, to absorb and reduce static charge, and the like. Speaking generally, a grounded connection allows electricity to pass through the grounded connection to ground instead of through, for example, a human that has come into contact with the circuit. Additionally, grounding a circuit helps to stabilize voltages within the circuit.

With continued reference to FIG. 2, electric vehicle charging port 204 may include a variety of other pins. For example, electric vehicle charging port 204 may include a proximity detection pin and/or a communication pin. Controller 220 may receive a current datum from the proximity detection pin. In some embodiments, the proximity detection pin may be electrically connected to controller 220 to transmit current datum. Proximity detection pin has no current flowing through it when electric vehicle charging port 204 is not connected to a charger, such as a connector of a charger. Once electric vehicle charging port 204 is connected to a connector, then proximity detection pin will have current flowing through it, allowing for the controller to detect, using this current flow, that the electric vehicle charging port 204 is connected to a charger. In some embodiments, current datum may be the measurement of the current passing through proximity detection pin. In some embodiments proximity detection pin may have a current sensor that generates the current datum. In other embodiments, proximity detection sensor may be electrically connected to controller and controller may include a current sensor. Communication pin may transmit signals between an electric vehicle and controller 220. Communication pin may be electrically or communicatively connected to controller 220.

Still referring to FIG. 2, electric vehicle charging port 204 includes a protection circuit 208. Protection circuit 208 is configured to control a transmission of power through electric vehicle charging port 204. In this disclosure, a "protection circuit" is used to protect the power supply from being forced to deliver excessive current into overload or short circuit. Protection circuit 208 also protects the connected circuit from a reverse connected power supply or a voltage that exceeds the circuit design voltage. Protection circuit 208 may include any suitable circuit and/or circuit breaker. For example and without limitation, protection circuit 208 may include a Zener voltage regulator circuit, Zener diode circuit, crowbar protection circuit, voltage clamping circuit, voltage limiting circuit, etc. Protection circuit 208 may be contained in the Protection Circuit Module (PCM). PCM may be part of a battery management system located inside the electric vehicle.

Referring still to FIG. 2, electric vehicle charging port 204 comprises a sensor 212. As used in this disclosure a "sensor" is a device, module, and/or subsystem, utilizing any hardware, software, and/or any combination thereof to detect events and/or changes in the instant environment and transmit the information; transmission may include transmission of any wired or wireless electronic signal. Sensor 212 may be attached, mechanically coupled, and/or communicatively coupled, as described above, to vehicle and/or components thereof. Sensor 212 may include a current sensor, gyroscope, accelerometer, torque sensor, magnetometer, inertial measurement unit (IMU), pressure sensor, force sensor, proximity sensor, displacement sensor, vibration sensor, among others. Sensor 212 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

Still referring to FIG. 2, sensor 212 is configured to detect an output current 216. In this disclosure, an "output current" refers to the measurement of the amount of energy that comes out of a charger or the corresponding electric vehicle charging connector or the amount of energy that comes out of the electric aircraft and is transmitted to a charging station, such as a charging grid. In other non-limiting embodiments, an input voltage may also be detected by sensor 212 to measure the amount of energy that is received by port 204 from connector. An "electric current" is a stream of charged particles moving through electric vehicle charging port 204 and/or components of the electric vehicle. Electrical current is measured as the net rate of flow of electric charge through a surface or into a control volume. Output current 216 may be measured in amperes, or amps, which is the flow of electric charge across a surface at the rate of one coulomb per second; output current 216 may be measured using a device called an ammeter. As an example and without limitation, output current 216 may also be measured by using a sense resistor in series with the circuit and measuring the voltage drop across the resister, or any other suitable instrumentation or methods for detection or measurement of current. Output current 216 may be directly proportional to the potential difference measured across the conductor, usually measured in volts, divided by the resistance of the conductor, usually measured in ohms. Thus, one ampere is equivalent to one volt over one ohm. There are two major types of electrical currents: alternating current (AC) and direct current (DC). Output current 216 can include any data describing or detailing the current output from electric vehicle charging connector or electric aircraft energy source.

Still referring to FIG. 2, electric vehicle charging port 204 includes a controller 220. As used in this disclosure, a "controller" is a logic circuit, such as an application-specific integrated circuit (ASIC), FPGA, microcontroller, and/or computing device that is configured to control a subsystem. A controller may also include any circuit element or combination thereof that activates the protection circuit, including without limitation a diode, TRIAC, transistor, comparator, or the like that activates a blocking or shorting response in an overvoltage protection circuit. Controller 220 may include any computing device as described in this disclosure, including without limitation a microcontroller, microprocessor, digital signal processor (DSP) and/or system on a chip (SoC) as described in this disclosure. Controller 220 may include a digital or analog computing devices. For instance, controller 220 may include, but is not limited to, various types of logic gates including combinatoric, sequential, synchronous, asynchronous. Controller 104 may, in some embodiments, be used to control and/or activate protection circuit as described in further detail below. For example, and without limitation, controller 104 may include an analog circuit including one or more operational amplifiers and/or transistors. In another example, and without limitation, controller 104 may include a logic circuit including one or more logic gates. As used in this disclosure, a "logic circuit" is a circuit for performing logical operations on signal (e.g., input signals). In yet another example, and without limitation, controller 104 may include a processor. In some cases, controller 104 may include, for example and without limitation, a single circuit element such as a switch, a fuse, a circuit breaker switch or a single transistor. Controller 104 may also include, for example and without limitation, an application-specific integrated circuit (ASIC), a field programmable gate array (FPGA), a microcontroller and/or a computing device. Controller 220 may also include an analog computing device such as a comparator operational amplifier or other operational amplifiers. Computing device may include, be included in, and/or communicate with a mobile device such as a mobile telephone or smartphone. Controller 220 may include a single via a network interface device. Network interface device may be utilized for connecting controller 220 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 220 may include but is not limited to, for example, a computing device or cluster of computing devices in a first location and a second computing device or cluster of computing devices in a second location. Controller 220 may include one or more computing devices dedicated to data storage, security, distribution of traffic for load balancing, and the like. Controller 220 may distribute one or more computing tasks as described below across a plurality of computing devices of computing device, which may operate in parallel, in series, redundantly, or in any other manner used for distribution of tasks or memory between computing devices. Controller 220 may be implemented using a "shared nothing" architecture in which data is cached at the worker, in an embodiment, this may enable scalability of system 100 and/or computing device.

With continued reference to FIG. 1, controller 220 may be designed and/or configured to perform any method, method step, or sequence of method steps in any embodiment described in this disclosure, in any order and with any degree of repetition. For instance, controller 220 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 220 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Controller 220 is further described below with reference to FIG. 4. Controller 220 may be any controller described in U.S. Nonprovisional application Ser. No. 17/515,519, filed on Oct. 31, 2021, and entitled "SYSTEM FOR OVERVOLTAGE PROTECTION IN AN ELECTRIC AIRCRAFT AND A METHOD FOR ITS USE," the entirety of which is incorporated herein by reference.

Still referring to FIG. 2, controller 220 is configured to detect an overcurrent output 224 as a function of output current 216. In this disclosure, an "overcurrent output" is a piece of data discerning whether the circuit has reached overcurrent or not. Controller 220 may determine overcurrent output 224 by comparing the output current 216 to a current threshold level. "Current threshold level" is the value of amps that differentiates normal circuit activity from an overcurrent state; current threshold level may include a threshold level of current an electric aircraft battery is capable to intake for charging purposes. Examples of overcurrent output 224 include, without limitation, "overcurrent", "no overcurrent", or the like.

Still referring to FIG. 2, controller 220 is configured to trip protection circuit 208 as a function of overcurrent output 224. In this disclosure, "tripping" a circuit means shutting off the electrical flow in order to save the circuit from overheating, or an overcurrent state. Once the fault of overcurrent is detected through overcurrent output 224, then controller 220 stops the electrical flow going into electric vehicle charging port 204. Tripping protection circuit 208 may include any mechanism to shut off the electrical flow through electric vehicle charging port 204 as a function of the detection of overcurrent output 224. These mechanisms may include, without limitation, using an electrical fuse, inserting and opening a switch, automatically turning off the charger, or any other method to stop the current from flowing. Tripping protection circuit 208 may also include the use of any electrical switches. In this disclosure, an "electrical switch" is an electrical component that can disconnect or connect the current path in an electrical circuit, such as an electrical circuit of port 204; thus, switches interrupt the electric current or divert it from one conductor to another.

Still referring to FIG. 2, system 200 may include a charging circuit. As defined in this disclosure, a "charging circuit" is an electrical circuit including anything charging or being charged, from batteries of charging station to batteries of an electric vehicle, such as an aircraft. The charging circuit also includes components that are involved in charging the battery of the electric vehicle. Examples of components of the charging circuit include, but are not limited to, batteries, conductors, sensors, power sources, connectors, electric vehicle ports, ground conductors, and the like. In one or more non-limiting embodiments, controller 220 may be monitoring overcurrent in a charging station attached to electric vehicle via charging port 204.

Figure 3:
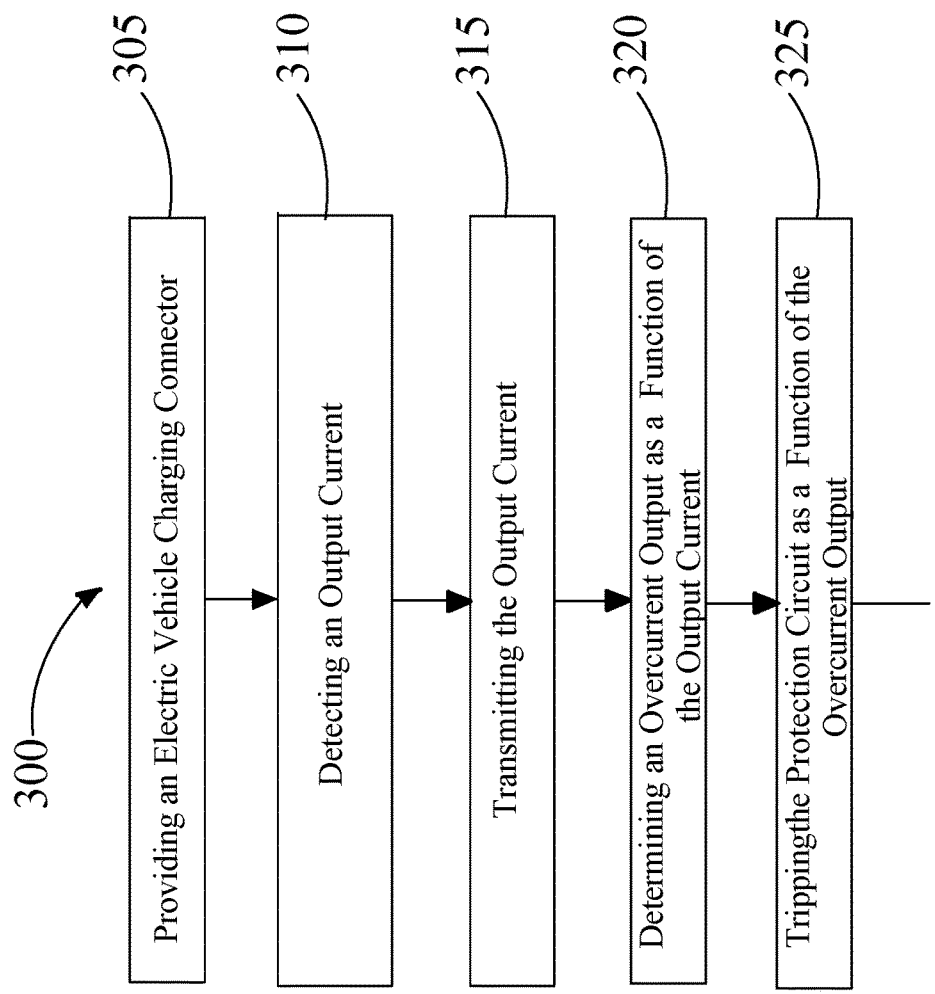
FIG. 3 is a block diagram of an exemplary embodiment of a method for the overcurrent protection in an electric vehicle.

Now referring to FIG. 3, an exemplary embodiment of a method 300 for the overcurrent protection in an electric vehicle is presented. Electric vehicle may include, but without limitation, any of the vehicles as disclosed herein and described above with reference to at least FIG. 1.

Still referring to FIG. 3, at step 305, method 300 includes providing charging port 204, which may include AC pin and DC pin to allow a transmission of power through port 204. For example, and without limitation, AC pin and DC pin may allow for a current to flow between the electric vehicle and charging station, such as a charger. Port 204 may also include a sensor 212. Port 204 may also include a controller 220. Port 204 also includes a protection circuit 208 as discussed below. In one or more embodiments, method 300 includes controlling, by protection circuit 208 of charging port 204, a transmission of power through electric vehicle charging port 204. In one or more embodiments, protection circuit 208 may include a mechanism to shut off the electrical flow through electric vehicle charging port 204 and/or a connector of a charging station as a function of the detection of the overcurrent output. Protection circuit 208 may include a mechanism to redirect current through the electric vehicle charging port to ground. Protection circuit 208 may include a circuit breaker.

Still referring to FIG. 3, at step 310, method 300 includes detecting, using sensor 212 an output current 216 of a connector or port, such as port 204. In one or more embodiments, sensor 212 may include a thermal sensor. In one or more embodiments, method may include communicatively connecting sensor 212 to controller 220.

Still referring to FIG. 3, at step 315, method 300 includes transmitting the output current detected by sensor 212 to controller 220. The output current 216 may be transmitted as data and/or information, as understood by one skilled in the art.

Still referring to FIG. 3, at step 320, method 300 includes determining, by controller 220, overcurrent output 224 as a function of output current 216. In one or more embodiments, determining overcurrent output 224 may include output current to a current threshold level. In one or more embodiments, current threshold level represents a maximum input current for an electric vehicle energy source, such as a battery. In other embodiments, current threshold level represents a maximum input current for a charging station battery. In one or more embodiments, controller 220 includes a computing device.

Still referring to FIG. 3, at step 325, method 300 includes tripping, at controller 220, protection circuit 208 as a function of overcurrent output 224. Tripping protection circuit 208 may include a mechanism shutting off the electrical flow through the electric vehicle charging connector as a function of the detection of the overcurrent output. In one or more embodiments, tripping protection circuit 208 may include the use of electrical switches.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
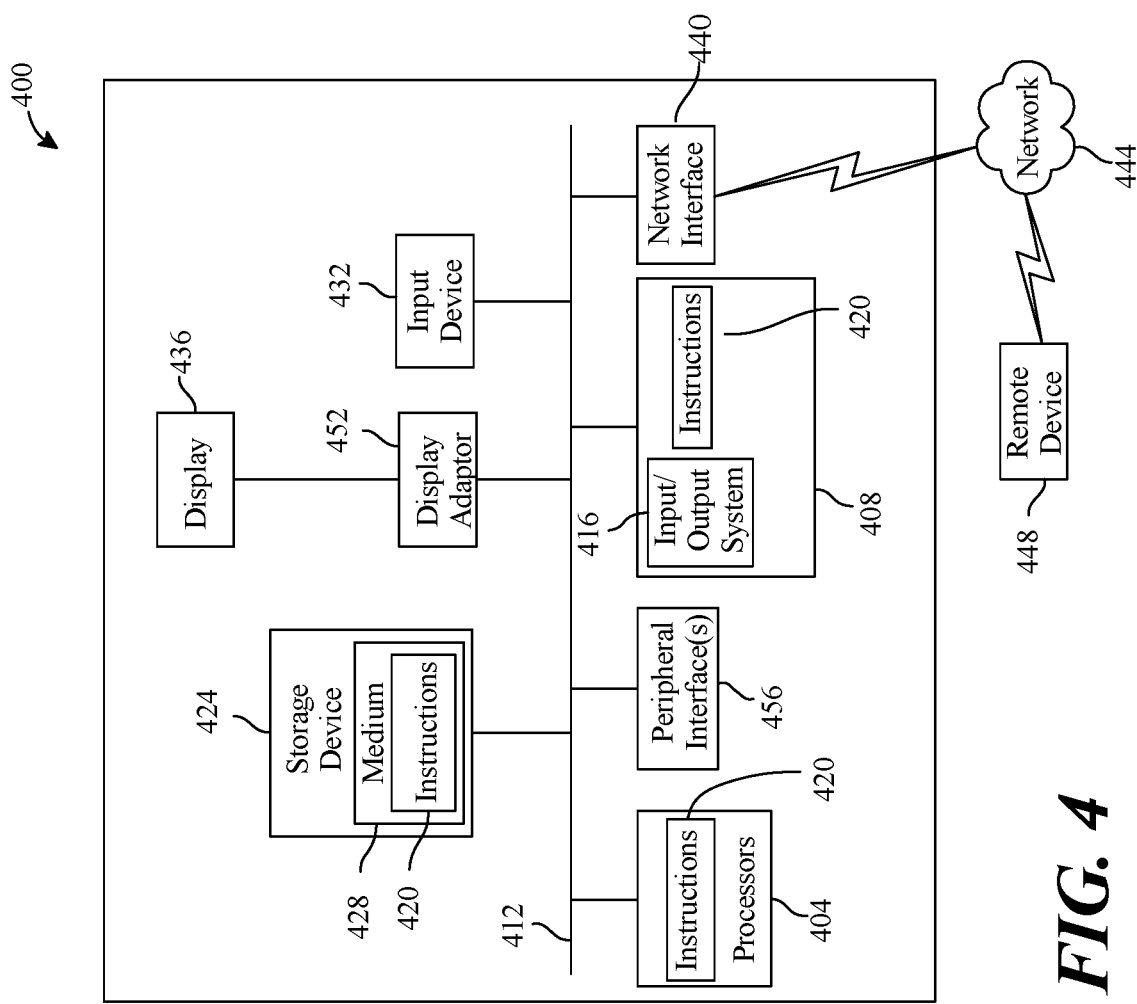
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Processor 404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 404 may be organized according to Von Neumann and/or Harvard architecture as a non-limiting example. Processor 404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for overcurrent protection in an electric vehicle, the system comprising:
   a charging port of an electric vehicle, wherein the charging port comprises:
      at least an AC pin;
      a protection circuit, wherein the protection circuit is configured to control the transmission of power through the electric vehicle charging port;
      a sensor suite, wherein the sensor suite includes a plurality of independent sensors working in tandem to detect an output current from a charging station; and
      a controller communicatively connected to the sensor suite, wherein the controller is configured to:
         detect an overcurrent output as a function of the output current; and
         trip the protection circuit as a function of the overcurrent output.

2. The system of claim 1, wherein the controller determines the overcurrent output by comparing the output current to a current threshold level.

3. The system of claim 2, wherein the current threshold level represents a maximum input current of an electric vehicle battery.

4. The system of claim 2, wherein the current threshold level represents a maximum input current for a charging station battery.

5. The system of claim 1, wherein the protection circuit includes a mechanism to shut off the electrical flow through the electric vehicle charging port as a function of the detection of the overcurrent output.

6. The system of claim 1, wherein the protection circuit includes a mechanism to redirect current through the electric vehicle charging port to ground.

7. The system of claim 1, wherein tripping the protection circuit includes the use of electrical switches.

8. The system of claim 1, wherein the sensor suite includes a thermal sensor.

9. The system of claim 1, wherein the protection circuit includes a circuit breaker.

10. The system of claim 1, wherein the controller includes a computing device.

11. A method of overcurrent protection in an electric vehicle, the method comprising:
    controlling, by a protection circuit of the charging port, a transmission of power through a charging port of the electric vehicle;
    detecting, by a sensor suite of the charging port, an output current, wherein the sensor suite includes a plurality of independent sensors working in tandem;
    transmitting, by the sensor suite, the output current to a controller of the charging port of the electric vehicle;
    determining, by the controller, an overcurrent output as a function of the output current; and
    tripping, by the controller, the protection circuit as a function of the overcurrent output.

12. The method of claim 11, wherein the controller determines the overcurrent output by comparing the output current to a current threshold level.

13. The method of claim 12, wherein the current threshold level represents a maximum input current for an electric vehicle battery.

14. The method of claim 12, wherein the current threshold level represents a maximum input current for a charging station battery.

15. The method of claim 11, wherein the protection circuit includes a mechanism to shut off the electrical flow through the electric vehicle charging port as a function of the detection of the overcurrent output.

16. The method of claim 11, wherein the protection circuit includes a mechanism to redirect current through the electric vehicle charging port to ground.

17. The method of claim 11, wherein tripping the protection circuit includes the use of electrical switches.

18. The method of claim 11, wherein the sensor suite includes a thermal sensor.

19. The method of claim 11, wherein the protection circuit includes a circuit breaker.

20. The method of claim 11, wherein the controller includes a computing device.

* * * * *

UNITED STATES PATENT AND TRADEMARK OFFICE
CERTIFICATE OF CORRECTION

| | | |
|---|---|---|
| PATENT NO. | : 12,330,522 B2 | Page 1 of 1 |
| APPLICATION NO. | : 17/732982 | |
| DATED | : June 17, 2025 | |
| INVENTOR(S) | : Herman Wiegman et al. | |

It is certified that error appears in the above-identified patent and that said Letters Patent is hereby corrected as shown below:

On the Title Page

Item (12) "Wiegman" should read -- Wiegman et al. --.

Item (72) under the inventor Herman Wiegman, South Burlington, VT (US) please add "...Michael Kuss, South Burlington, VT (US)......".

Signed and Sealed this
Eighteenth Day of November, 2025

John A. Squires
*Director of the United States Patent and Trademark Office*